United States Patent [19]

Janssen

[11] Patent Number: 5,523,352

[45] Date of Patent: Jun. 4, 1996

[54] POLYACETAL COMPOSITIONS AND METHOD OF IMPROVING WEAR RESISTANCE AND REDUCING FRICTION THEREOF

[75] Inventor: Robertus F. A. M. Janssen, Hooge Mierde, Netherlands

[73] Assignee: Kawasaki Chemical Holding Co., Inc., Wilmington, Del.

[21] Appl. No.: 307,995

[22] Filed: Sep. 16, 1994

[51] Int. Cl.⁶ .......................... C08L 59/02; C08L 23/16
[52] U.S. Cl. .......................................... 525/154; 524/538
[58] Field of Search ........................... 525/154; 524/538

[56] References Cited

U.S. PATENT DOCUMENTS

| | | | |
|---|---|---|---|
| 3,287,288 | 11/1966 | Reiling | 260/4 |
| 3,373,222 | 3/1968 | Armstrong | 260/857 |
| 3,779,918 | 12/1973 | Ikeda et al. | 252/12.6 |
| 4,001,124 | 1/1977 | Hussey | 252/12 |
| 4,670,508 | 6/1987 | Ohdaira et al. | 525/64 |
| 4,724,251 | 2/1988 | Rock | 525/104 |
| 4,725,392 | 2/1988 | Matsui et al. | 264/85 |
| 4,737,539 | 4/1988 | Jinno et al. | 524/508 |
| 4,877,813 | 10/1989 | Jinno et al. | 525/146 |
| 4,945,126 | 7/1990 | Crosby et al. | 524/507 |
| 5,009,820 | 4/1991 | Coates et al. | 264/13 |
| 5,171,827 | 12/1992 | Coates et al. | 528/348 |
| 5,177,158 | 1/1993 | Noma | 525/420 |
| 5,216,079 | 6/1993 | Crosby et al. | 525/146 |
| 5,237,008 | 8/1993 | Kosinski | 525/154 |
| 5,281,668 | 1/1994 | Heggs et al. | 525/166 |

FOREIGN PATENT DOCUMENTS 1252204  11/1971  United Kingdom .

*Primary Examiner*—W. Robinson H. Clark
*Attorney, Agent, or Firm*—Panitch Schwarze Jacobs & Nadel

[57] ABSTRACT

Self-lubricating compositions with improved friction, wear and melt flow properties are provided as well as a method of improving the friction, wear and melt flow properties of a polyoxyalkylene base resin. The composition includes a mixture of a polyoxyalkylene base resin with a low density polyethylene and an aramid powder in amounts effective to provide the improved properties.

18 Claims, No Drawings

POLYACETAL COMPOSITIONS AND METHOD OF IMPROVING WEAR RESISTANCE AND REDUCING FRICTION THEREOF

FIELD OF THE INVENTION

The present invention relates to self-lubricating polyoxyalkylene compositions. More particularly, the present invention is directed to polyoxyalkylene compositions which exhibit excellent friction, wear and melt flow properties. The present invention also relates to a method for improving friction, wear and melt flow properties of polyoxyalkylenes.

BACKGROUND OF THE INVENTION

Polyoxyalkylenes, also known as acetal or polyacetal, demonstrate excellent mechanical properties, chemical resistance and relatively good friction properties. As such, polyoxyalkylenes have been used in many diverse applications from plumbing parts to electrical switches. A primary use of polyoxyalkylenes is in the formation of moving parts in tribological systems in which one surface bears against another surface causing friction and wear to each surface. For example, polyoxyalkylenes are used as appliance parts such as gears, cams and rollers and are used in moving vehicles as gears, automobile window lift mechanisms and crank parts.

It is known in the art to provide good wear, friction and melt flow properties to polyoxyalkylene compositions by using fluorinated hydrocarbons, such as polytetrafluoroethylene (PTFE), as lubricant additives. However, in many areas of the world, particularly in Europe, fluorinated materials are creating increasing concern due to the potential of these substances to act as environmental hazards. As a result, it is becoming increasingly important to develop alternative, non-fluorinated lubricants for polyoxyalkylene compositions which are capable of delivering equivalent or improved wear, friction and melt flow properties.

U.S. Pat. Nos. 4,737,539 and 5,216,079 teach that polyolefins of a molecular weight less than 500,000, alone or in a blend with PTFE, can act as internal lubricants for various polymers, including polyoxymethylene. In addition, U.S. Pat. Nos. 4,737,539 and 4,877,813 teach use of PTFE and polyamide fibers to stabilize the coefficient of friction in certain resin compositions including polyoxymethylene.

While these compositions, and other prior art PTFE/polyoxyalkylene compositions, have achieved reasonably good wear properties, particularly when PTFE is added, a fluorocarbon-free composition has yet to be developed that safely and economically provides friction, wear and melt flow properties to polyoxyalkylene compositions which meet or exceed the values of those properties in a polyoxyalkylene composition containing PTFE. In addition, while prior art compositions including PTFE show good properties in tribological systems in which a surface formed of a polymeric composition containing a polyoxyalkylene bears against a metal surface or a different polymeric surface, those same properties have not been sufficiently demonstrated in tribological systems in which a surface formed of a polyoxyalkylene composition bears against another surface formed of the same material.

As a result, a need in the art exists for a self-lubricating, fluorocarbon-free polyoxyalkylene composition which provides equivalent or improved wear, friction and melt flow properties to those exhibited by fluorocarbon-containing polyoxyalkylene compositions. In addition, it is desirable to develop such a composition which not only exhibits such properties in plastic against metal tribological wear systems, but also in plastic against plastic tribological wear systems in which the two plastic surfaces are the same.

SUMMARY OF THE INVENTION

The present invention includes a self-lubricating composition which comprises a mixture of a polyoxyalkylene base resin, a low density polyethylene and an aramid powder. The low density polyethylene and the aramid powder are mixed in amounts effective to provide improved friction, wear and melt flow properties to the composition.

The present invention also includes a method for improving the wear, friction and melt flow properties of a polyoxyalkylene base resin. The method comprises melt mixing with a polyoxyalkylene base resin, a low density polyethylene and an aramid powder in lubricating amounts.

DETAILED DESCRIPTION OF THE PREFERRED EMBODIMENTS

The polyoxyalkylene base resin used in the present compositions may be any suitable polyoxyalkylene, including, for example, homopolymers and copolymers of polyoxymethylene and polyoxyethylene and mixtures and blends thereof. Preferably, the polyoxyalkylene is a polyoxymethylene copolymer. Suitable commercially available polyoxyalkylenes include, for example, Delrin® available from DuPont de Nemours & Co., Inc., Celcon® available from Hoechst Celanese Corp., and Ultraform® available from BASF, Inc. The polyoxyalkylene preferably has a weight average molecular weight (Mw) of from about 40,000 to about 80,000. More preferably, the Mw is about 60,000. The polyoxyalkylene base resin preferably comprises from about 70 weight percent to about 99 weight percent of the composition.

The composition according to the present invention further includes minor portions of a low density polyethylene (LDPE) and of an aramid powder. The LDPE and aramid powder are added to the composition in amounts effective to provide improved friction, wear and melt flow properties.

The LDPE preferably is any suitable, commercially available LDPE homopolymer or copolymer which has an Mw of from about 25,000 to about 300,000. Preferably the Mw of the LDPE is less than or equal to about 220,000 and greater than or equal to about 50,000. The LDPE may be either branched or linear, but is preferably a linear LDPE homopolymer. Preferably, the LDPE is one which remains as discrete identifiable particles after melt mixing or processing the composition. Suitable commercially available LDPEs include, for example, and without limitation, Escorene® from Exxon Chemical Co. and Lupolen® from BASF. Preferably, the LDPE is added to the composition such that it is about 0.5 weight percent to about 10 weight percent of the final composition.

The aramid powder is preferably formed of an aromatic aramid, for example, poly(para-phenylene-terephthalamide). However, other aromatic polyamides which include recurring polyamide units such as m-phenylene isophthalamide may also be used. Other recurring units which may be used in addition to or in place of para-phenylene-terephthalamide include, for example, derivatives of aromatic dicarboxylic acids, aromatic diamines and their dianhydrides and acid halides.

Preferably, the aramid powder is a poly(paraphenylene terephthalamide) having an Mw of from about 20,000 to about 45,000, and more preferably about 33,500, or a number average molecular weight (Mn) of from about 5,000 to about 15,000, and more preferably about 10,500. Preferably, the average particle size of the aramid powder is from about 10 to about 100 microns as measured in the longest particle dimension. More preferably, the average particle size is from about 50 to about 90 microns. Suitable commercially available aramid powders include Twaron® available from AKZO. The smaller the particle size, the better the mechanical properties tend to be, particularly impact strength. Smaller particle sizes also appear to benefit melt flow. Therefore, it is generally preferred that the particle size is within the stated parameters, and is preferably the smallest commercially available particle size which is still economical. Preferably, the amount of aramid powder added to the composition is from about 0.5 weight percent to about 20 weight percent.

It is preferred that the LDPE and aramid powder added to the polyoxyalkylene base resin are added such that the ratio of the weight of LDPE to aramid powder in the final composition ranges from about 1:0.03 to about 1:20.

The LDPE and aramid powder are added in lubricating amounts. More particularly, the LDPE and aramid powder are added in amounts effective to provide improved friction, wear and melt flow properties to the polyoxyalkylene composition. The two components act together to improve these properties significantly over the addition of either one of the components individually to the polyoxyalkylene base resin. As such, the LDPE and aramid powder are most preferably added in amounts effective to provide the composition with a combination of friction, wear and melt flow properties which are all significantly improved over the properties achieved by either a composition including only polyoxyalkylene and aramid powder or a composition including only polyoxyalkylene and LDPE.

In the preferred embodiment of the present invention the LDPE and aramid powder provide the improved properties such that potentially environmentally hazardous additives such as fluoropolymeric lubricants may be avoided. As a result, it is preferred that the composition be free of fluoropolymeric additives. Other additives, such as processing additives, however, may be mixed into the composition. Typical additives include organic and inorganic fillers including, for example, mica, wollastonite, talc, calcium carbonate and the like; reinforcing agents such as glass fibers, graphite fibers and similar substances; plasticizers; heat stabilizers; ultraviolet stabilizers; tougheners; antistatic agents; and colorants. Other conventional additives for polymer composites will be readily apparent to those of ordinary skill in the art based upon this disclosure. Preferably, the additives may be present in the composition in an amount of from about 0.1% to about 50% by weight and more preferably, in an amount less than about 40% by weight.

The self-lubricating compositions of the present invention are useful in applications such as those known in the prior art or which are to be developed for other self-lubricating compositions or compositions having lubricant additives, particularly including tribological applications in which a surface formed of the present composition bears against another surface, including another different plastic surface or a metal surface. However, unlike prior art self-lubricating compositions, the present compositions also exhibit particularly excellent wear, friction and melt flow properties in tribological applications in which two identical surfaces, both formed of the compositions of the present invention, bear against each other. Experimentation with the compositions of the present invention reveals that they exhibit greatly improved friction, wear and melt flow properties, including lower coefficients of friction and increased surface wear resistance which are at least comparable, and in many cases better, than the same properties achieved by compositions including fluoropolymeric lubricants such as PTFE.

Aramid fiber additives have been used to induce friction in certain applications, for example, in automotive break linings. As such, aramid fiber typically exhibits the undesirable properties of a stiff melt flow and high coefficients of friction. LDPE, which while acting as a lubricant, does not typically achieve a flexural modulus in a polyoxyalkylene composition of over 2.0 GPa. In addition, LDPE/polyoxyalkylene compositions have relatively poor wear factors, and exhibit delamination when added in amounts sufficient to improve other properties. As such, adding aramid powder and LDPE to polyoxyalkylene would not lead one to believe that these properties would be significantly improved from the interaction between the aramid powder and the LDPE.

However, experiments conducted show that compositions in accordance with the present invention typically show a wear factor (K) having a maximum value of about 10, a coefficient of static friction having a maximum value of about 0.07 and a coefficient of dynamic friction having a maximum of about 0.12 as measured in a tribological system in which a metal surface bears against a plastic surface. In addition, the melt flow typically ranges from about 3 to 5 g/10 minutes as measured at 190° C. and 2.16 kg. At the same time, the mechanical properties achieved by the compositions of the present invention are also excellent and are comparable to those of PTFE/polyoxyalkylene compositions, demonstrating sufficient strength without unwanted stiffness. The present compositions typically show notched Izod impact values of a minimum of about 35 J/m, unnotched Izod impact values of a minimum of about 350 J/m, a minimum tensile strength of about 45 MPa, a minimum flexural strength of 55 Mpa and a minimum flexural modulus of about 2.2 Gpa. These properties are better shown in the examples set forth below.

The invention will now be described in more detail with respect to the following specific, non-limiting examples:

COMPARATIVE EXAMPLE I

A control composition and a first comparative composition were each prepared by extrusion compounding on a Zwei Snecken Kneder type extruder having a 58 inch screw diameter (ZSK-58) The first composition (Control Sample) contained 20% by weight of PTFE having a melting point range of 327°±5° C. and a mean particle-size of ≦50 microns with no particles greater than about 100–150 microns, and 80% by weight of a commercially available polyoxymethylene copolymer. The particular polyoxymethylene copolymer used was BASF Ultraform® N2320. The second composition (Comparative Sample I) also included 80% by weight of the same polyoxymethylene copolymer and included 20% by weight of a commercially available aramid fiber. The specific fiber used was 1.5 mm DuPont Kevlar® 29. The Control Sample and Comparative Sample I were each evaluated for their mechanical, wear, friction and melt flow properties. Wear and friction properties in this Example, in Comparative Example II and in Example III were measured by forming a component from each composition and causing a surface of the component to bear against a stainless steel surface, i.e. the friction and wear properties are measured for a plastic/metal tribological system. The results are shown below in Table I.

TABLE I

| Component | Control Sample | Comparative Sample I |
|---|---|---|
| BASF Ultraform ® N2320 (polyoxymethylene copolymer) | 80 wt % | 80 wt % |
| PTFE | 20 wt % | — |
| DuPont Kevlar ® 29 (aramid fiber) | — | 20 wt % |
| Measured Property | | |
| Notched Izod Impact (J/m) | 50 | 65 |
| Unnotched Izod Impact (J/m) | 340 | 540 |
| Tensile Strength (MPa) | 47 | 65 |
| Flexural Strength (MPa) | 56 | 80 |
| Flexural Modulus (GPa) | 1.9 | 3.4 |
| Wear Factor (K) | 4.2 | 8.2 |
| Static Coefficient of Friction | 0.03 | 0.13 |
| Dynamic Coefficient of Friction | 0.08 | 0.15 |
| Melt Flow (190° C./2.16 kg) (g/10 min.) | 5 | 0.9 |

While the results show that addition of aramid fiber to the polyoxymethylene copolymer (Comparative Sample I) provides an improved flexural strength, flexural modulus and tensile strength as well as a reasonably good wear factor (K) in comparison to the Control Sample, the melt flow and coefficients of friction of Comparative Sample I were unacceptable to be a useful self-lubricating polyoxyalkylene composition. In addition, the raw material cost of Comparative Sample I was prohibitive at approximately 50% more than the raw material cost of the Control Sample.

COMPARATIVE EXAMPLE II

The Control Sample was then compared to a further composition (Comparative Sample II) which was prepared in the same manner as the Control Sample and Comparative Sample I. Comparative Sample II included 90.57% by weight of the same polyoxymethylene copolymer as used in Comparative Example I and 9.43% by weight of a commercially available LDPE. The specific LDPE used was BASF Lupolen® 1800H which has a Mw of about 250,000 and is known for its lubrication properties. Comparative Sample II was tested in the same manner as the compositions of Comparative Example I and the results appear below in Table II.

TABLE II

| Component | Control Sample | Comparative Sample II |
|---|---|---|
| BASF Ultraform ® N2320 (polyoxymethylene copolymer) | 80 wt % | 90.57 wt % |
| PTFE | 20 wt % | — |
| BASF Lupolen ® 1800H (LDPE) | — | 9.43 wt % |
| Measured Property | | |
| Notched Izod Impact (J/m) | 50 | 60 |
| Unnotched Izod Impact (J/m) | 340 | 875 |
| Tensile Strength (MPa) | 47 | 45 |
| Flexural Strength (MPa) | 56 | 51 |
| Flexural Modulus (GPa) | 1.9 | 1.8 |
| Wear Factor (K) | 4.2 | 34 |
| Static Coefficient of Friction | 0.03 | 0.07 |
| Dynamic Coefficient of Friction | 0.08 | 0.08 |
| Melt Flow (190° C./2.16 kg)(g/10 min.) | 5 | 8.8 |

In preparing Comparative Sample II, the maximum LDPE which could be added to the polyoxymethylene copolymer was about 9.4% as delamination began to occur. As a result of the low level of LDPE, the wear factor could not be brought low enough to be acceptable, although the coefficients of friction were acceptable. The flexural modulus of Comparative Sample II was still not of the acceptable range as achievable in the compositions of the present invention.

EXAMPLE III

Two further compositions were prepared by the same method as the previous examples. The first composition, Comparative Sample III included 85.3% by weight of the same polyoxymethylene copolymer, 10% by weight of the same aramid fiber used in Comparative Sample I and 4.7% by weight of the same LDPE used in Comparative Sample II. The second composition, Sample IV, was prepared in accordance with the present invention and included 85.3% by weight of the same polyoxymethylene copolymer used in the previous Samples, 10% by weight of a commercially available aramid powder and 4.7% by weight of the same LDPE used in Comparative Sample II. The specific aramid powder used was Twaron® 5011 by AKZO. The average particle size of the aramid powder was measured at 70 microns. The powder as evaluated in accordance with DIN 4188 had a particle size distribution as follows: d10=35 microns, d50=55 microns and d90=85 microns.

Comparative Sample III and Sample IV were each tested and compared to the Control Sample. The results appear in Table III below.

TABLE III

| Component | Control Sample | Comparative Sample III | Sample IV |
|---|---|---|---|
| BASF Ultraform ® N2320 (polyoxymethylene co-polymer) | 80 wt % | 85.3 wt % | 85.3 wt % |
| PTFE | 20 wt % | — | — |
| DuPont Kevlar ® 29 (aramid fiber) | — | 10.0 wt % | — |
| AKZO Twaron ® 5011 (aramid powder) | — | — | 10.0 wt % |
| BASF Lupolen ® 1800H (LDPE) | — | 4.7 wt % | 4.7 wt % |
| Measured Property | | | |
| Notched Izod Impact (J/m) | 50 | 75 | 45 |
| Unnotched Izod Impact (J/m) | 340 | 525 | 405 |
| Tensile Strength (MPa) | 47 | 63 | 46 |
| Flexural Strength (MPa) | 56 | 64 | 60 |
| Flexural Modulus (GPa) | 1.9 | 2.6 | 2.4 |
| Wear Factor (K) | 4.2 | 9.5 | 9.4 |
| Static Coefficient of Friction | 0.03 | 0.07 | 0.06 |
| Dynamic Coefficient of Friction | 0.08 | 0.09 | 0.10 |
| Melt Flow (190° C./2.16 kg) (g/10 min.) | 5 | 1.5 | 4.1 |

The results show that use of aramid fiber in addition to LDPE, as in Comparative Sample III, yielded improved mechanical and wear properties, but still did not show an improved melt flow comparable to the Control Sample. Sample IV, however, showed improved mechanical, wear and melt flow properties which are similar to or better than those achievable in the Control Sample.

Use of only 4.7% LDPE in both Comparative Sample III and in Sample IV eliminated the delamination problem which occurred in Comparative Example II. As shown above, aramid fiber contributed to a lower melt flow when used in Comparative Sample I. The use of LDPE in addition to aramid fiber in Comparative Sample III, did not appear to sufficiently improve the melt flow. However, the use of the aramid powder in Sample IV yielded a melt flow comparable to the Control Sample. It has not yet been explained why the aramid powder behaved differently than the aramid fiber, particularly since a lower, stiffer melt flow was expected from the aramid powder due to the overall particle distribution in the polyoxymethylene copolymer.

Sample IV, which included aramid powder, also lowered raw material costs. As was shown above, in Comparative Example I, use of aramid fiber significantly increases raw material costs of a polyoxyalkylene composition. The raw material cost of Comparative Sample III, while lower than that of Comparative Sample I, was still approximately 28% higher than the cost of the Control Sample. In contrast, the raw material cost of Sample IV was 12% less than that of the Control Sample.

When the amount of aramid used in Comparative Sample I was reduced by about one half in Comparative Sample III and Sample IV, the wear factor unexpectedly remained constant despite the addition of LDPE which was shown in Comparative Example II to have a negative impact on the wear factor. In a similar manner, when the quantity of LDPE used in Comparative Example II was reduced by about one half in Comparative Sample III and in Sample IV, the coefficients of friction remained largely unchanged despite the presence of the aramid which was shown in Comparative Example I to have a negative impact on friction properties.

Such behavior appears to violate the law of mixtures wherein properties of a composition are related to the proportion of components used. As a result, the use of aramid powder in Sample IV exhibited a synergistic effect wherein the addition of the aramid powder and LDPE together to the polyoxymethylene copolymer provided unexpectedly improved properties to the polyoxyalkylene composition despite the effects of either of the two other components when mixed with polyoxymethylene copolymer individually.

EXAMPLE IV

Experiments were conducted in order to compare the friction and wear properties of compositions according to the present invention to prior art polyoxyalkylene compositions including PTFE when each composition is used in a tribological system in which a surface formed of each composition bears against a second surface formed of the same material, i.e., in a plastic/plastic tribological system in which both plastic surfaces are the same.

As such, wear and friction properties were measured in experiments in which one component formed from several of the compositions described in the previous examples (Comparative Samples II and III and Sample IV), as well as an additional sample (Comparative Sample V), was made to bear against a second component formed from the same composition. A similar experiment was performed on the Control Sample. Comparative Sample V includes a mixture of 85% by weight of the same polyoxymethylene copolymer used in the previous examples and 15% by weight of the AKZO® 5011 aramid powder as used in Sample IV. The results of these experiments appear below in Table IV.

TABLE IV

| Component | Control | Comp. Sample II | Comp. Sample III | Sample IV | Comp. Sample V |
|---|---|---|---|---|---|
| BASF Ultraform ® N2320 (polyoxymethylene copolymer) (wt %) | 80 | 90.57 | 85.3 | 85.3 | 85 |
| PTFE (wt %) | 20 | — | — | — | — |
| BASF Lupolen ® 1800H (LDPE) (wt %) | — | 9.43 | 4.7 | 4.7 | — |
| DuPont Kevlar ® 29 (aramid fiber) (wt %) | — | — | 10 | — | — |
| AKZO Twaron ® 5011 (aramid powder) (wt %) | — | — | — | 10 | 15 |
| Measured Property | | | | | |
| Wear Factor-Moving Surface* | 570 | 21.4 | 3.9 | 4.2 | 3.0 |
| Wear Factor-Stationary Surface* | 600 | 32.7 | 21.1 | 5.9 | 7.3 |
| Static Coefficient of Friction | 0.19 | 0.16 | 0.10 | 0.09 | 0.13 |
| Dynamic Coefficient of Friction | 0.17 | 0.09 | 0.11 | 0.09 | 0.15 |

*(in.$^5$-min./ft.-lb.-hr. × $10^{-10}$)

As the data above shows, Sample IV, made in accordance with the present invention, shows excellent friction and wear properties in a tribological system in which two plastic surfaces made of the same material bear against one another. In comparison to the other Sample compositions, most particularly the Control Sample, Sample IV has the most improved wear and friction results overall.

Although some of the comparative samples in the Examples above show comparable wear properties or comparable friction coefficients to those of the inventive samples, only the samples of the present invention showed both good wear and friction properties in plastic-plastic wear systems, as well as good melt flow properties.

The invention also includes a method for improving wear, friction and melt flow properties of a polyoxyalkylene base resin. The method includes melt mixing with a polyoxyalkylene base resin lubricating amounts of a LDPE and an aramid powder. Preferably, the LDPE and the aramid powder are melt mixed with the polyoxyalkylene base resin in a range of weight percentage ratios of from about 1:0.03 to about 1:20 LDPE to aramid powder. Preferably, the aramid powder is melt mixed in an amount of from about 0.5 weight percent to about 20 weight percent and the LDPE is melt mixed in an amount of from about 0.5 weight percent to about 10 weight percent of the final composition.

The method may further include the step of melt mixing processing additives, such as those described above, into the composition. Preferably, the method also includes melt mixing the aramid powder into the composition in the form of particles having an average particle size of from about 10 to about 100 microns as measured in the longest dimension, and more preferably from about 50 to about 90 microns.

The aramid powder, LDPE and polyoxyalkylene base resins useful for the present method are preferably the same as those described above with respect to the composition of the present invention.

The components may be melt mixed in accordance with any suitable method which would be known to those skilled in the art based upon this disclosure. For example, the components may be melt mixed by using a static or screw/ auger-type mixer, a twin-screw compounding extruder or a single-screw compounding extruder. Preferably, the components are mixed by melt-extrusion.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A self-lubricating composition, comprising a mixture of:

(a) a polyoxyalkylene base resin; and (b) a low density polyethylene and an aramid powder in the form of particles having an average particle size as measured in the longest dimension of from about 10 to about 100 microns, the low density polyethylene and the aramid powder being present in amounts effective to provide improved friction, wear and melt flow properties to the composition.

2. The composition according to claim 1, wherein the low density polyethylene is present in an amount from about 0.5 wt % to about 10 wt %, the aramid powder is present in an amount from about 0.5 wt % to about 20 wt %, and the polyoxyalkylene is present in an amount of from about 70 wt % to about 99 wt %.

3. The composition according to claim 1, wherein the low density polyethylene and the aramid powder are present in a range of weight percentage ratios of from about 1:0.03 to about 1:20.

4. The composition according to claim 1, wherein the composition is free of fluoropolymeric lubricant additives.

5. The composition according to claim 1, further comprising additives selected from the group consisting of fillers, reinforcing agents, plasticizers, heat stabilizers, ultraviolet stabilizers, tougheners, antistatic agents and colorants.

6. The composition according to claim 1, wherein the aramid powder comprises a poly(para-phenylene-terephthalamide) having a weight average molecular weight from about 20,000 to about 45,000.

7. The composition according to claim 6, wherein the poly(para-phenyleneterephthalamide) has a weight average molecular weight of about 33,500.

8. The composition according to claim 1, wherein the aramid powder is in the form of particles having an average particle size as measured in the longest dimension of from about 50 to about 90 microns.

9. The composition according to claim 1, wherein the low density polyethylene has a weight average molecular weight of from about 25,000 to about 300,000.

10. The composition according to claim 9, wherein the low density polyethylene has a weight average molecular weight of less than about 220,000.

11. The composition according to claim 1, wherein the polyoxyalkylene is selected from the group consisting of polyoxymethylene and polyoxyethylene homopolymers and copolymers and mixtures and blends thereof.

12. The composition according to claim 11, wherein the polyoxyalkylene is a polyoxymethylene copolymer having a weight average molecular weight of about from about 40,000 to about 80,000.

13. The composition according to claim 12, wherein the polyoxymethylene copolymer has a weight average molecular weight of about 60,000.

14. A method for improving wear, friction and melt flow properties of a polyoxyalkylene base resin, comprising melt mixing with the polyoxyalkylene base resin lubricating amounts of a low density polyethylene and an aramid powder.

15. The method according to claim 14, further comprising the step of melt mixing the low density polyethylene and the aramid powder in a range of weight percentage ratios of from about 1:0.03 to about 1:20 of the low density polyethylene to the aramid powder with the polyoxyalkylene base resin.

16. The method according to claim 14, wherein the aramid powder is melt mixed in an amount of about 0.5 wt % to about 20 wt % of a final mixture and the low density polyethylene is melt mixed in an amount of about 0.5 wt % to about 10 wt % of the mixture.

17. The method according to claim 14, further comprising the step of melt mixing additives selected from the group consisting of fillers, reinforcing agents, plasticizers, heat stabilizers, ultraviolet stabilizers, tougheners, antistatic agents and colorants into the polyoxyalkylene.

18. The method according to claim 14, wherein the aramid powder is melt mixed in the polyoxyalkylene base resin in the form of particles having an average particle size as measured in the longest dimension of from about 10 to about 100 microns.

* * * * *